United States Patent
Ogawa et al.

(10) Patent No.: US 8,366,888 B2
(45) Date of Patent: Feb. 5, 2013

(54) WATER TREATMENT APPARATUS

(75) Inventors: Yui Ogawa, Osaka (JP); Hiroyuki Umezawa, Osaka (JP); Tetsuya Yamamoto, Osaka (JP); Tsuyoshi Rakuma, Osaka (JP); Hiroyuki Kobayashi, Osaka (JP); Masahiro Iseki, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 585 days.

(21) Appl. No.: 12/570,624

(22) Filed: Sep. 30, 2009

(65) Prior Publication Data
US 2010/0108497 A1  May 6, 2010

(30) Foreign Application Priority Data

Sep. 30, 2008 (JP) ................. 2008-255809
Mar. 23, 2009 (JP) ................. 2009-069893

(51) Int. Cl.
*C25B 9/00* (2006.01)
(52) U.S. Cl. .................. 204/276; 204/240
(58) Field of Classification Search ........ 204/276, 204/240
See application file for complete search history.

(56) References Cited

U.S. PATENT DOCUMENTS

| 5,770,037 | A * | 6/1998 | Goto et al. ........... 205/701 |
| 8,062,485 | B2 * | 11/2011 | Ogawa et al. ......... 204/269 |
| 2009/0288959 | A1 * | 11/2009 | Nakano ............... 205/744 |

FOREIGN PATENT DOCUMENTS

| JP | 06-208710 | 7/1994 |
| JP | 2007-175140 | 7/2007 |
| JP | 2008-307524 | 12/2008 |

* cited by examiner

*Primary Examiner* — Nicholas A. Smith
(74) *Attorney, Agent, or Firm* — McDermott Will & Emery LLP

(57) ABSTRACT

A water softening module has a case body which includes cover members secured to their respective ends of a cylindrical case. A pair of electrodes are provided in the case body. A fibrous medium is located in contact with a water-outlet-side face of the electrodes. The fibrous medium has a stacked structure constituted of a first fiber layer and a second fiber layer, which are electrically conductive. The first fiber layer is positioned in contact with the upstream side of the second fiber layer, and the first fiber layer is positioned in contact with the downstream-side face of the electrodes. The specific surface area of the first layer is smaller than that of the second fiber layer.

9 Claims, 11 Drawing Sheets

10

WATER TREATMENT APPARATUS

CROSS-REFERENCE TO RELATED APPLICATIONS

This application is based upon and claims the benefit of priority from the prior Japanese Patent Applications No. 2008-255809, filed on Sep. 30, 2008, and Japanese Patent Application No. 2009-069893, filed on Mar. 23, 2009, the entire contents of which are incorporated herein by reference.

BACKGROUND OF THE INVENTION

1. Field of the Invention

The present invention relates to a water treatment apparatus that removes hardness components from water electrically.

2. Description of the Related Art

There are air sterilizing apparatuses known in the art which are designed to counteract viruses and the like suspended in the air, using an electrolyzed water, containing hypochlorous acid, generated by an electrolysis of tap water or the like. In this type of air sterilizing apparatus, the air is sterilized as viruses and the like in the air passing through a gas-liquid contact member are inactivated through contact with the electrolyzed water supplied to the gas-liquid contact member.

However, there are instances where the electrolyzed water used in inactivating viruses and the like contains hardness components (calcium ions, magnesium ions, etc.). And once these hardness components turn into solid matter (scale) inside the gas-liquid contact member, the air passages in the gas-liquid contact member can develop clogging, which may cause a drop in the equipment's capacity for sterilizing. To resolve this problem, a water treatment apparatus called a water softening module is used in softening water by reducing the hardness of electrolyzed water in advance. Also in use is a type of water treatment apparatus called a water softening module, in which the water to be treated is softened by having the hardness components precipitate as scale on electrode portion.

A problem with such conventional water treatment apparatuses has been the precipitation of hardness components as scale on the electrode portion, which results in a pressure loss in the flow path and thus a drop in the amount of passing water. This has been a main cause of the reduced capacity of the equipment in removing the hardness components from water.

SUMMARY OF THE INVENTION

The present invention has been made to solve the above-mentioned problems, and a purpose thereof is to provide a technology for suppressing the increase in the pressure loss in the flow path of a water treatment apparatus that is designed to remove hardness components from water. Another purpose thereof is to provide a technology for suppressing the increase in the pressure loss in the flow path by collecting the scale precipitated on the electrode portion of a water treatment apparatus designed to remove hardness components contained in water by precipitating the hardness components as scale.

One embodiment of the present invention relates to a water treatment apparatus. The water treatment apparatus has a flow path of water entering through a water inlet and exiting through a water outlet, and it comprises: a first plate-shaped electrode disposed on a water inlet side of the flow path, the first electrode having water permeability; a second plate-shaped electrode disposed on a water outlet side of the flow path; and a fibrous medium disposed in contact with a water-outlet-side face of the first electrode, the fibrous medium having a profile area almost equal to the peripheral area of the first electrode and being constituted of electrically conductive fiber, wherein the fibrous medium includes: a first carbon fiber layer disposed on a first electrode side; and a second carbon fiber layer disposed on a second electrode side of the first carbon fiber layer, the specific surface area of the second carbon fiber layer being larger than that of the first carbon fiber layer.

According to this embodiment, the specific surface area of the first fiber layer is smaller (e.g., 10 to 1000 times smaller) than that of the second fiber layer, and the performance of adsorbing ions by the first fiber layer is small. Thus the precipitation of precipitates in the first fiber layer is inhibited. As a result, the occurrence of pressure loss in the flow path at the first fiber layer is suppressed and the precipitates can be efficiently precipitated in the second fiber layer whose specific surface layer is large.

In the above embodiment, a space may be provided between the fibrous medium and the second electrode. In the above embodiment, the water treatment apparatus may further comprise a support member, disposed in contact with a space side of the fibrous medium, which is formed as a mesh made of an insulating material. In the above embodiment, the water outlet may be provided in such a manner as to be connected to the space between the fibrous medium and the second electrode. In the above embodiment, the first carbon fiber layer may have a higher water permeability than the second carbon fiber layer.

Another embodiment of the present invention relates also to a water treatment apparatus. This water treatment apparatus processes to-be-treated water containing hardness components that turn into scale and it comprises: a flow path of water entering through a water inlet and exiting through a water outlet; a first plate-shaped electrode disposed on a water inlet side of the flow path, the first electrode having water permeability; a second plate-shaped electrode disposed apart on a downstream side of the first electrode, the second electrode having water permeability, a DC power supply which applies voltage between the electrode and the second electrode; a conductive filtering medium disposed in contact with a downstream-side face of the first electrode; a scale precipitation chamber, disposed between the filtering medium and the second electrode, where the hardness components are precipitated on a surface of the filtering medium as scale; and a scale collector, disposed below the scale precipitation chamber, which communicates with the scale precipitation chamber, wherein the to-be-treated water, entering through the water inlet, exits through the water outlet and the to-be-treated water, passing through the filtering medium, accelerates the scale formed on the surface of the filtering medium to fall into the scale collector where the scale is collected.

It is to be noted that any arbitrary combinations or rearrangement, as appropriate, of the aforementioned constituting elements and so forth are all effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
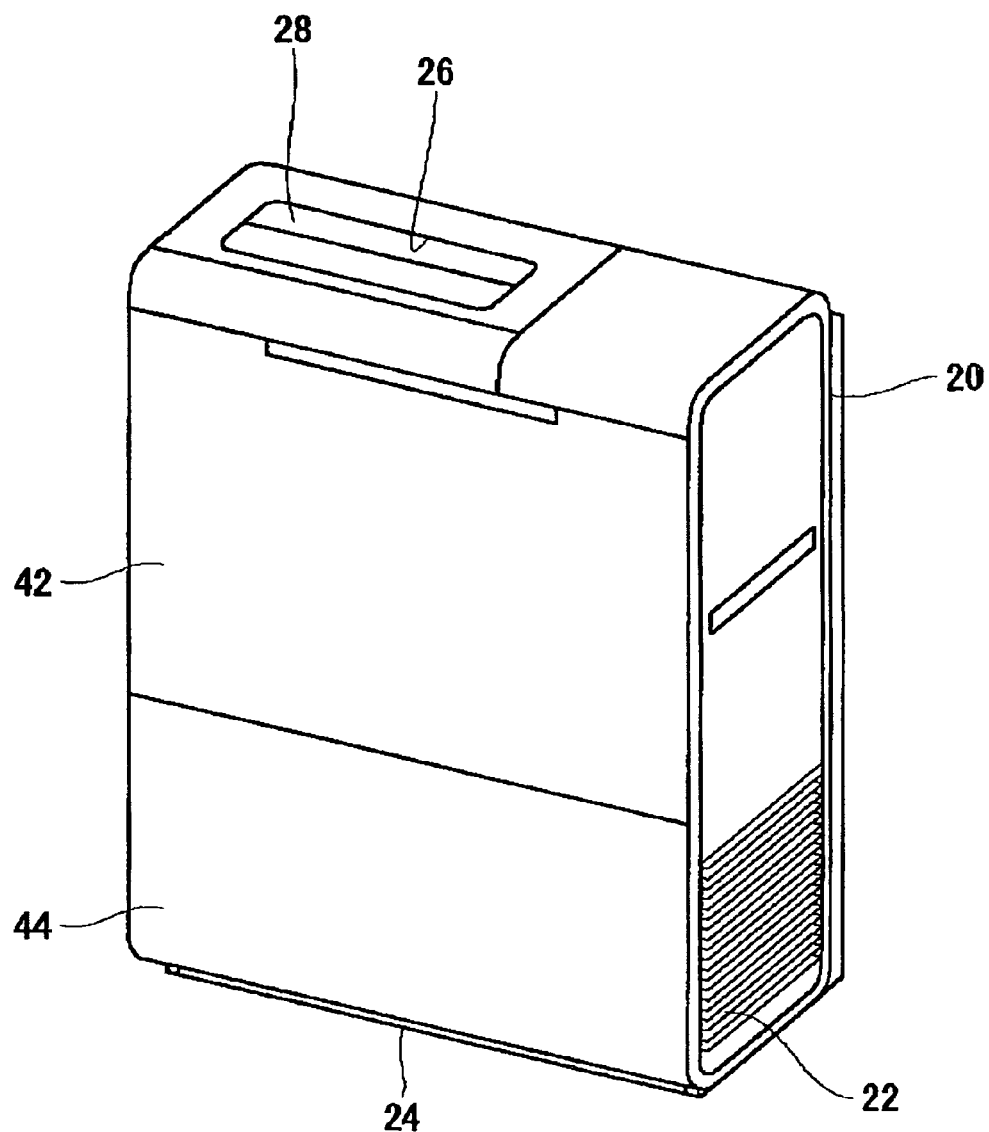
FIG. 1 is a perspective illustration of an appearance of an air sterilizing apparatus according to a first embodiment of the present invention.

The invention will now be described by reference to the preferred embodiments. This does not intend to limit the scope of the present invention, but to exemplify the invention.

Hereinbelow, the embodiments will be described with reference to the accompanying drawings. Note that in all of the Figures the same reference numerals are given to the same components and the description thereof is omitted as appropriate.

First Embodiment

Figure 2:
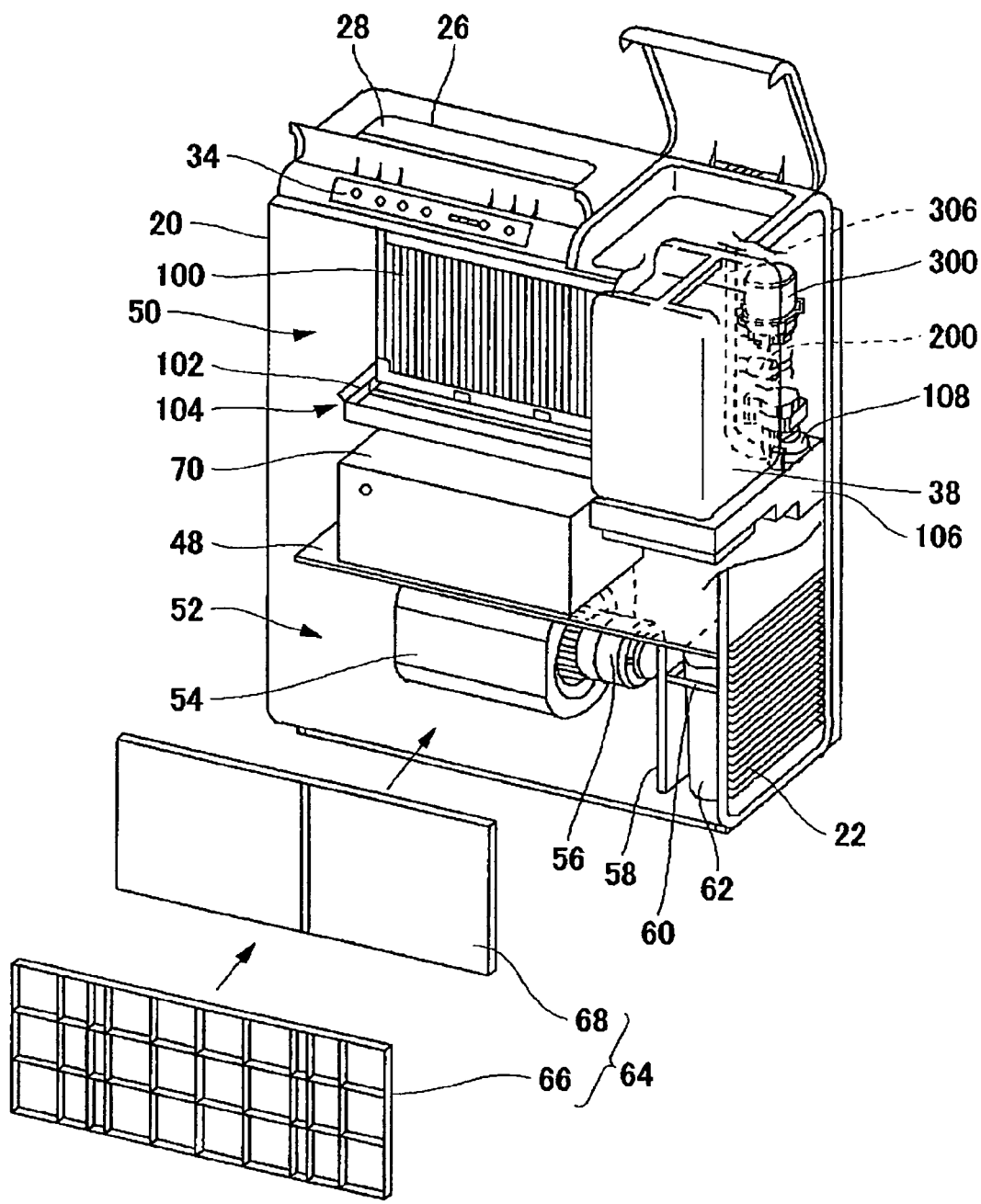
FIG. 2 is a perspective illustration showing an internal structure of an air sterilizing apparatus according to a first embodiment of the present invention.

FIG. 1 is a perspective illustration of an appearance of an air sterilizing apparatus 10 according to a first embodiment of the present invention. FIG. 2 is a perspective illustration showing an internal structure of the air sterilizing apparatus 10.

The air sterilizing apparatus 10, which is enclosed in a box-shaped casing 20, is installed on a floor, for instance. The air sterilizing apparatus 10 has air suction grilles 22 formed in the lower part of both side faces of the casing 20. Also, the air sterilizing apparatus 10 has an air suction opening 24 formed in the lower part of the front face of the casing 20.

The air sterilizing apparatus 10 also has an air blow opening 26 in the upper face of the casing 20, and the air blow opening 26 is provided with a louver 28 which can change the direction of air blowing. The louver 28 has an opening/closing mechanism that can automatically close the air blow opening 26 when the operation is stopped.

The air sterilizing apparatus 10 cleans the air inside a room by blowing out air through the air blow opening 26 after sterilizing the air sucked in through the air suction grilles 22 and the air suction opening 24.

The casing 20 has a support plate 48 which divides the interior thereof into an upper chamber 50 and a lower chamber 52 (see FIG. 2). Disposed in the lower chamber 52 are a blast fan 54 and a fan motor 56. Also, housed in the space on the right-hand side of a partition plate 58 is a drainage tank 62, provided with a handle 60, which can be pulled out to the front of the casing 20. The blast fan 54, the fan motor 56, and the drainage tank 62 are disposed side by side with each other.

A prefilter 64 is detachably installed between the blast fan 54 and the air suction opening 24, i.e., in a position in the lower chamber 52 opposite to a lower cover 44 (see FIG. 1). The prefilter 64 is comprised of a first filter 66, which captures dust and the like of relatively large particle diameter present in the air sucked in through the air suction grilles 22 and the air suction opening 24, and a second filter 68, which captures matter with the particle diameter of about 10 μm, for instance, having passed through the first filter 66. Thus, pollens, dust and the like suspended in the air are removed by the prefilter 64, and the filtered air is sent into the upper chamber 50 by the blast fan 54.

On the other hand, in the upper chamber 50, an electrical box 70 is disposed in a position above the blast fan 54 and the fan motor 56. The electrical box 70 houses various electrical components, which include a control board packaging various devices constituting a control unit (not shown) controlling the operation of the air sterilizing apparatus 10, a power circuit for supplying power to the fan motor 56, and various electrical components such as electrodes 220 and 221 of a water softening module and a three-way valve 314 (described later). The control unit 80 controls the operation of the louver 28, the fan motor 56, and the like in response to the operation on a control panel 34 by the user.

Disposed above the electrical box 70 is a gas-liquid contact member 100, which sterilizes air by having the passing air come in contact with electrolyzed water. Disposed below the gas-liquid contact member 100 is a water tray 104 provided with a water receiver 102 which receives water and electrolyzed water dripping from the gas-liquid contact member 100. The water tray 104 is also provided with a reservoir 106 which is formed deep enough to retain water. The reservoir 106 is so configured as to receive and store the electrolyzed water that has dripped into the water receiver 102. Also, the reservoir 106 extends toward the upper part of the drainage tank 62.

Further, a feed-water tank 38 is disposed above the reservoir 106, so that water can be supplied to the reservoir 106 from the feed-water tank 38.

Also, disposed above the reservoir 106 are a circulation pump 108, which sends electrolyzed water to the upper side of the gas-liquid contact member 100, a water softening module 200 (water treatment apparatus), which reduces the hardness of the electrolyzed water, and an electrolytic cell 300, which produces electrolyzed water.

Figure 3:
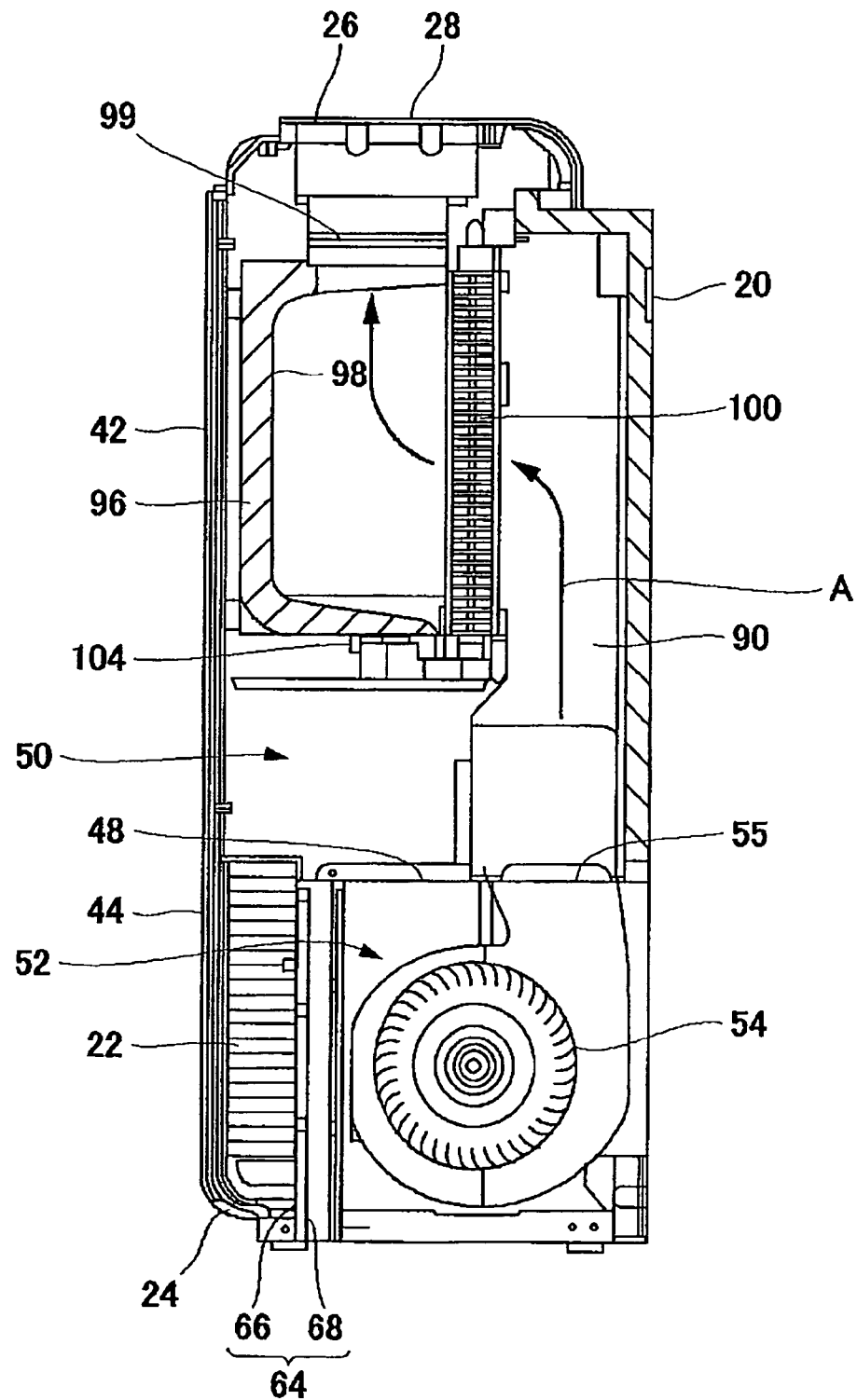
FIG. 3 is a right-hand sectional view showing an internal structure of an air sterilizing apparatus according to a first embodiment of the present invention.

Next, a description will be given of the flow of air in an air sterilizing apparatus 10. FIG. 3 is a right-hand sectional view showing an internal structure of the air sterilizing apparatus 10.

The air blown out of a blast outlet 55 of a blast fan 54 moves past a space 90 and is blown into the back face of the gas-liquid contact member 100 as indicated by arrow A in FIG. 3. The air having passed through the gas-liquid contact member 100 moves on, guided by an internal surface 98 of a second air guiding member 96, moves past an air blow opening filter 99 disposed below the air blow opening 26, and is sent out through the air blow opening 26.

Figure 4:
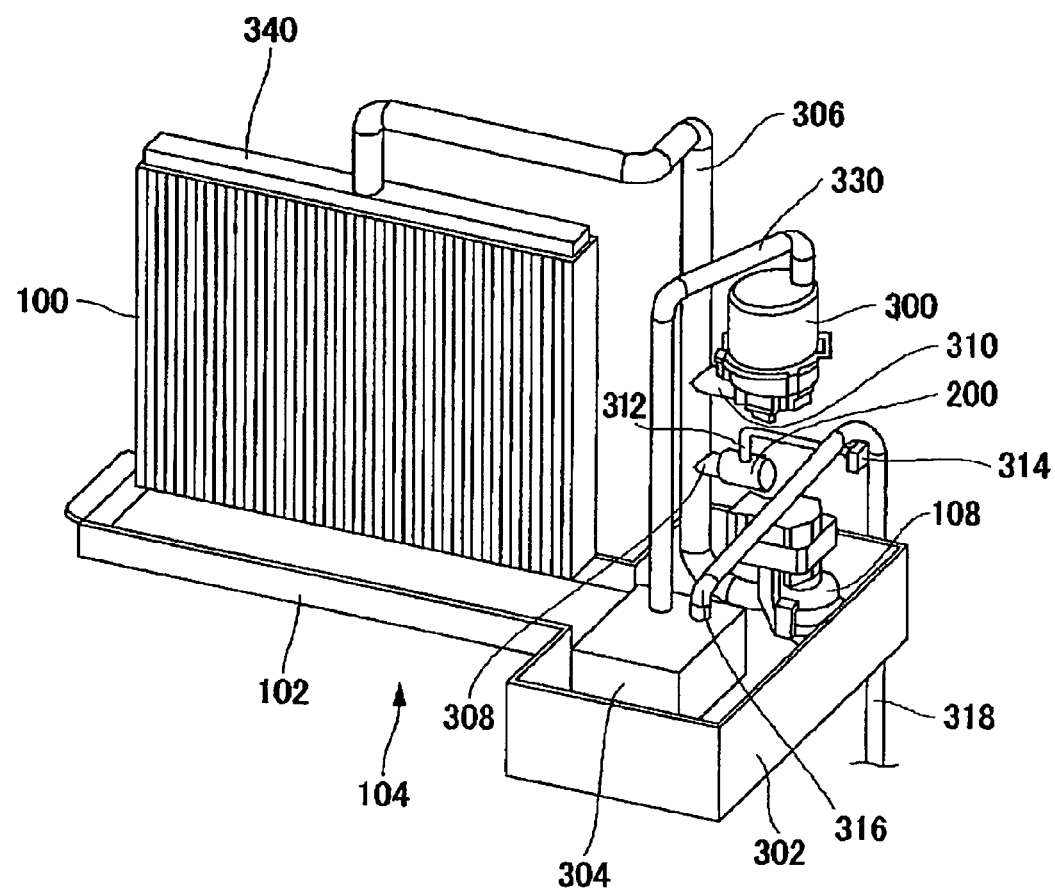
FIG. 4 is a schematic illustration showing a structure of essential part of an air sterilizing apparatus, where electrolyzed water is generated and circulated, according to a first embodiment of the present invention.

FIG. 4 is a perspective illustration showing a structure of the essential part of an air sterilizing apparatus 10 where electrolyzed water is generated and circulated. The air sterilizing apparatus 10 repeatedly uses the electrolyzed water for sterilizing air by circulating it therein. In the air sterilizing apparatus 10, electrolyzed water is stored in a reservoir 302, and the electrolyzed water is drawn up therefrom by a circulation pump 108. Part of the electrolyzed water drawn up from the reservoir 302 by the circulation pump 108 is supplied to the gas-liquid contact member 100, where the electrolyzed water infiltrating the gas-liquid contact member 100 sterilizes the air coming in contact with it. Then the electrolyzed water returns to the reservoir 302 before it is again supplied to the gas-liquid contact member 100 by the circulation pump 108 to be used for sterilization repeatedly.

The gas-liquid contact member 100, which is disposed above the water receiver 102, is used for the sterilization of air, and the electrolyzed water flowing down from the gas-liquid contact member 100 is received by the water receiver 102.

A water tray 104 includes a water receiver 102 and a reservoir 302 which are integrally structured together. The water receiver 102 is formed one level higher than the reservoir 302 such that the electrolyzed water flowing down from the gas-liquid contact member 100 into the water receiver 102 flows to the reservoir 302. Also, disposed in the flow path of electrolyzed water from the water receiver 102 to the reservoir 302 is a filter 304 which captures solid matter (scales) contained in the water flowing down from the gas-liquid contact member 100.

The circulation pump 108 is so disposed that the suction inlet thereof is located below the surface of water in the reservoir 302, and the circulation pump 108 discharges electrolyzed water through a water pipe 306 connected to the discharge outlet thereof. The water pipe 306 is a piping interconnecting the circulation pump 108 and the gas-liquid contact member 100. Also, connected to the water pipe 306 are a first branch pipe 308 and a second branch pipe 310, each branching off the water pipe 306. The first branch pipe 308 is connected to the water softening module 200, and the second branch pipe 310, which branches off downstream of the first branch pipe 308, is connected to the electrolytic cell 300. Thus the electrolyzed water is also supplied to the water softening module 200 and the electrolytic cell 300 from the circulation pump 108.

The water softening module 200 carries out a process of softening the electrolyzed water supplied through the first branch pipe 308. Water softening meant here is a processing in which calcium ions ($Ca_2^+$), magnesium ions ($Mg_2^+$), and the like contained in water are precipitated in order to reduce the concentration of hardness components therein. The water softening module 200, which has a pair of electrodes 220 and 222 (see FIG. 6) incorporated therewithin as will be discussed later, lowers the hardness of the electrolyzed water by applying a voltage between the electrodes 220 and 222.

A three-way valve 314 is connected to a water discharge pipe 312 of electrolyzed water of the water softening module 200. Connected to one exit of the three-way valve 314 is a softened water return pipe 316 (first discharge pipe) for sending softened electrolyzed water back to the reservoir 302, and connected to the other exit thereof is a water pipe 318 (second discharge pipe) which is connected to the drainage tank 62. The three-way valve 314 is switched by the control of the control unit 80.

On the other hand, in the electrolytic cell 300, an electrolyzed water containing hypochlorous acid (HClO) as an effective sterilizing component is generated through electrolysis of water by applying a voltage between a pair of electrodes 320 and 322 (see FIG. 5) as will be described later. And connected to the discharge outlet of the electrolytic cell 300 is an electrolyzed water discharge pipe 330 for sending out the electrolyzed water to the reservoir 302.

Also, both the softened water return pipe 316 and the electrolyzed water discharge pipe 330 are terminated in their respective positions above the filter 304. The electrolyzed water exiting the water softening module 200 and the electrolytic cell 300 is sent directly into the filter 304 from the ends of the softened water return pipe 316 and electrolyzed water discharge pipe 330. Then the electrolyzed water, after scale and the like in it are filtered out by the filter 304, returns to the reservoir 302.

The electrolyzed water generated by the electrolytic cell 300 is supplied from the reservoir 302 to the gas-liquid contact member 100 by the operation of the circulation pump 108. Then, air, as it passes through the gas-liquid contact member 100, is sterilized with viruses and the like suspended in it inactivated through contact with the electrolyzed water. The electrolyzed water is effective not only in sterilizing the air but also in inhibiting the propagation of bacteria in the gas-liquid contact member 100 itself. Further, the electrolyzed water containing hypochlorous acid has an effect of deodorizing because the electrolyzed water containing it can remove odor from within the air by ionizing and dissolving the odor in the electrolyzed water as the odor passes through the gas-liquid contact member 100.

The gas-liquid contact member 100, which is a filter of a honeycomb structure, allows the dripping of electrolyzed water and is less prone to clogging.

Figure 5:
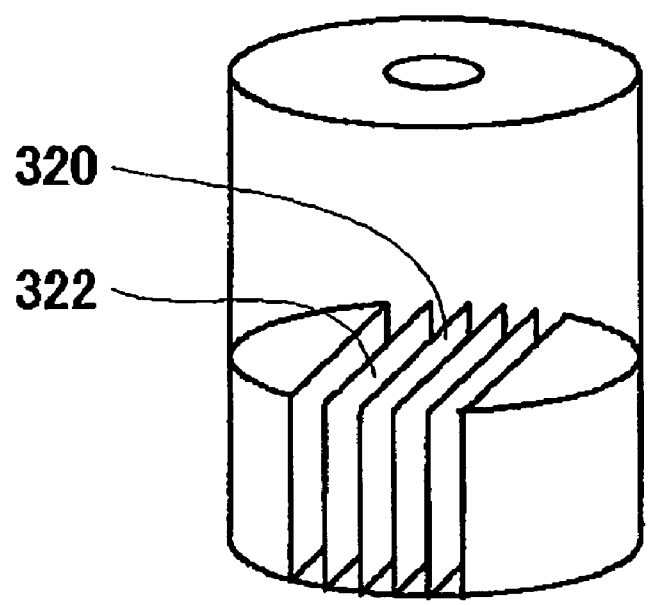
FIG. 5 shows a structure of an electrolytic cell provided in an air sterilizing apparatus according to a first embodiment of the present invention.

FIG. 5 shows a structure of an electrolytic cell 300. Referring to FIG. 5, the supply of electrolyzed water to the gas-liquid contact member 100 will be explained. In the first embodiment, a description will be given of a case where the air sterilizing apparatus 10 is operated with tap water in the feed-water tank 38 (see FIG. 2).

With the feed-water tank 38 containing tap water set in the air sterilizing apparatus 10, the tap water is sent from the feed-water tank 38 to the reservoir 302 until the tap water reaches a predetermined level. The water in the reservoir 302 is drawn up by the circulation pump 108 and supplied to the electrolytic cell 300. In the electrolytic cell 300, which is provided with a pair of electrodes 320 and 322 as shown in FIG. 5, tap water entering there is electrolyzed into an electrolyzed water containing active oxygen species. Note that the active oxygen species meant here are oxygen having higher oxidative activity than ordinary oxygen and its related substances. And the active oxygen species include narrowly-defined active oxygens, such as superoxide anion, singlet oxygen, hydroxyl radical and hydrogen peroxide, and broadly-defined active oxygens, such as ozone and hypohalous acid.

The electrodes 320 and 322 are electrode plates each comprised of a base of titanium (Ti) and a film layer of iridium (Ir) and platinum (Pt). The value of current flowing through the electrodes 320 and 322 is so set as to be several to several tens of $mA/cm^2$ in current density in order to obtain a predetermined free residual chlorine concentration (1 mg per liter (1 mg/l), for instance).

To describe in more detail, a current from an external power supply is applied between the electrodes 320 and 322, one of which being an anode and the other a cathode. Then, at the cathode, the following reaction takes place between hydrogen ions (H⁺) and hydroxide ions (OH⁻) in the water:

$$4H^+ + 4e^- + (4OH^-) \rightarrow 2H_2 + (4OH^-).$$

On the other hand, at the anode, the water is electrolyzed by the following reaction:

$$2H_2O \rightarrow 4H^+ + O_2 + 4e^-.$$

At the anode, chlorine ions (chloride ions: Cl⁻) contained in the water produce chlorine (Cl₂) through the following reaction:

$$2Cl^- \rightarrow Cl_2 + 2e^-.$$

Further, the chlorine, through reaction with water as expressed below, produces hypochlorous acid (HClO) and hydrogen chloride (HCl):

$$Cl_2 + H_2O \rightarrow HClO + HCl.$$

The electrolyzed water in the reservoir 302, which is constantly and steadily subjected to the softening and electrolytic processing, is circulated to the gas-liquid contact member 100, where the electrolyzed water is used to sterilize air. And the electrolyzed water whose hardness is lowered by the water softening module 200 flows through a circulation path exiting and again returning to the reservoir 302.

It is to be noted that scale, as has been discussed already, occurs mainly for the following cause. In most cases, tap water or the like, which is supplied to the electrolytic cell 300 to be turned into an electrolyzed water, contains hardness components (calcium ions, magnesium ions, etc.). When air sterilization is conducted over a long period of time, the hardness components in the water can get condensed through evaporation of the electrolyzed water and thus precipitate as scale especially at the gas-liquid contact member 100 where the evaporation can occur easily. With scales adhering to the surface of the gas-liquid contact member 100, there will be an increased likelihood that the gas-liquid contact member 100 clogs or the retentivity of electrolyzed water in the gas-liquid contact member 100 drops, which will in turn lead to a drop in sterilization efficiency due to the reduced contact between air and electrolyzed water. Also, the sterilization efficiency may drop due to, for example, insufficient supply of electrolyzed water when scales adhere to the electrodes 320 and 322 in the electrolytic cell 300 or when the piping gets clogged with the scales.

According to the first embodiment, the occurrence of scale is suppressed by the use of a water softening module 200 which lowers the hardness of electrolyzed water.

Figure 6:
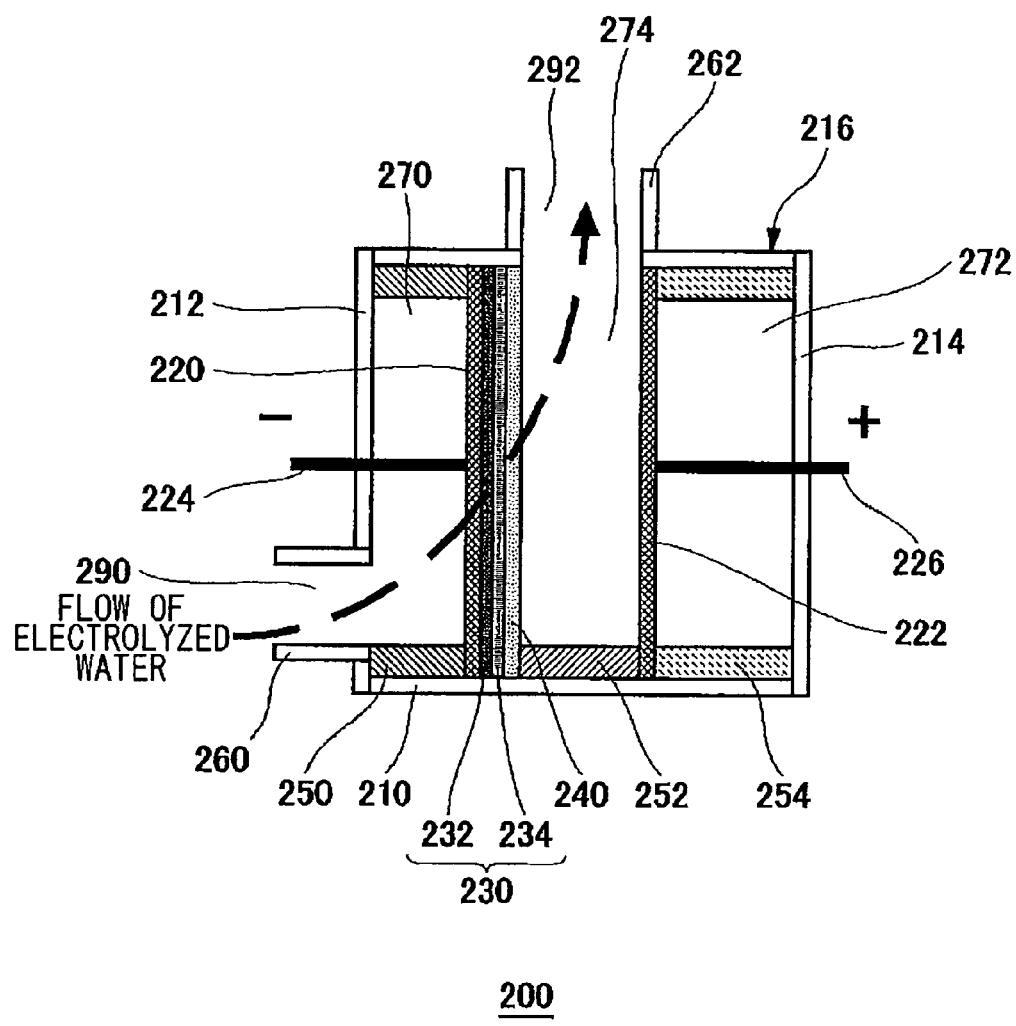
FIG. 6 is a schematic illustration of a structure of a water softening module according to a first embodiment of the present invention.

FIG. 6 is a schematic illustration showing a structure of a water softening module 200. The water softening module 200 has a case body 216 which comprises cover members 212 and 214 secured to their respective ends of a cylindrical case 210. The water softening module 200 includes a pair of electrodes 220 and 222, a conductive fibrous medium (capturing member) 230 capable of capturing and trapping ions, a support member 240 having insulation properties, and securing rings 250, 252, 254, which are all housed in the case body 216.

The cover member 212 is provided with a water inlet 290, and the water inlet 290 is provided with a joint 260 which connects to the first branch pipe 308 (see FIG. 4). Note that the water inlet 290 according to the first embodiment is located below (vertically below) the cover member 212. The case 210 has a water outlet 292 in its side face, and the water outlet 292 is provided with a joint 262 which connects to the water discharge pipe 312 (see FIG. 4). That is, the electrolyzed water enters through the water inlet 290 provided in the cover member 212 side and exits through the water outlet 292 provided in the upper part of the case 210, moving through a flow path formed inside the case body 216 from the water inlet 290 to the water outlet 292. It is to be noted that the case body 216 is made of a resin material having insulation properties. The cover members 212 and 214 are detachably installed on the case 210.

The electrodes 220 and 222, which are both disk-shaped, are installed with their outer peripheries in contact with the inner peripheral surface of the case 210. The electrode 220 is spaced apart from the cover member 212 on the side where the electrolyzed water enters, so that there is a space 270 between the cover member 212 and the electrode 220. On the other hand, the electrode 222 is spaced apart from the cover member 214 on the side where the electrolyzed water exits, so that there is a space 272 between the cover member 214 and the electrode 222. The electrode 222 is located closer to the cover member 214 than the joint 262, so that there is a space 274 between the electrode 220 and the electrode 222.

The electrodes 220 and 222 are each formed of a reticulated (meshy) metal or alloy. For example, the electrodes 220 and 222 are each a lattice electrode (lattice height: 5.3 mm, lattice width: 14.0 mm) the dimensions of which is 65 mm in diameter and 1 mm in thickness. The electrodes 220 and 222 can thus pass water. Therefore, the electrolyzed water can flow through the electrode 220 from a joint 260 side to a joint 262 side, and the electrolyzed water can also move to and fro between the space 272 and the space 274, passing through the electrode 222. Note that the metals constituting the electrodes 220 and 222 may preferably be Pt, Ti, and Pt—Ir alloy. To be more specific, the electrodes 220 and 222 may be each an electrode plate whose base is Ti and whose film layer is of a Pt—Ir alloy. To ensure the capacity for passing water, the aperture ratio of the electrodes 220 and 222 may be, for instance, 71 percent.

Also, connected to the electrode 220 is a metallic bar 224 for power feeding on a cover member 212 side. The metallic bar 224, penetrating the cover member 212, is connected to a power source provided on the outside of the water softening module 200. In a similar manner, connected to the electrode 222 is a metallic bar 226 for power feeding on a cover member 214 side. The metallic bar 226, penetrating the cover member 214, is connected to the power source provided on the outside of the water softening module 200.

The fibrous medium 230 has a stacked structure comprised of a first fiber layer 232 and a second fiber layer 234, which are electrically conductive. Accordingly, the fibrous medium 230 serves also as an electrode provided counter to the electrode 222.

The first fiber layer 232, which is disposed in contact with the upstream side of the second fiber layer 234, is electrically coupled thereto. The first fiber layer 232, which is disposed in contact with the downstream-side face of the electrode 220, is electrically coupled thereto. On the other hand, disposed in contact with the downstream side of the second fiber layer 234 is the support member 240 which has insulation properties. The support member 240 has a strength and rigidity sufficient to keep the downstream-side face of the second fiber layer 234 flat.

The first fiber layer 232 is an accumulation of electrically conductive fibers whose specific surface area (surface area per unit weight) is smaller than that of the second fiber layer 234. The first fiber layer 232 shows lower ion adsorption performance, or hardness removal capacity, than the second fiber layer 234. One reason for a drop in hardness removal capacity of the first fiber layer 232 is a reduction in specific surface area, which causes a reduced charge amount stored in the surface of the first fiber layer 232 and the resulting drop in the performance of chemically adsorbing calcium ions, magnesium ions, and the like.

More specifically, it is desirable that the specific surface area of the first fiber layer 232 is 1/10 or less of the specific surface area of the second fiber layer 234. For example, the specific surface areas of the first fiber layer 232 and the second fiber layer 234 are 15 m$^2$/g and 1250 m$^2$/g, respectively. The hardness removal rates of the first fiber layer 232 and the second fiber layer 234 in this case are 8.5% and 61.5%, respectively. The hardness removal rates meant here are the values of hardness after the processing of water passage through the water softening module in relation to those before that. In the present example, the hardness removal rates were calculated using 1 liter of water whose hardness was 100 mg/liter.

[Hardness removal rate (%)]=[Hardness after the processing]/(Hardness before processing)]×100.

To be more precise, the first fiber layer 232 is a felt-like member (e.g., 2 mm thick) which is formed of carbon fiber and is compressible. The compressibility meant here is the property of material whose volume can decrease under pressure.

The second fiber layer 234 is a felt-like member (e.g., 2 mm thick) which is formed of activated carbon fiber and is compressible.

The first fiber layer 232 is obtained by subjecting the raw material to a heat treatment and then graphitizing the material having been made infusible. Specifically, the raw material, such as pitch-type fiber (carbon fiber using coal pitch as raw material), polyacrylonitrile-based fiber or the like, is first oxidized in the air at 200 to 300° C. to produce black-colored oxidized fiber as intermediate material. In this process called flame retardation, the carbon fiber, which forms a ring-shaped structure of the molecules with the progress of oxidation, becomes flame retardant and infusible. The carbon fiber thus obtained is carbonized at 2500° C. and then graphitized to produce a carbon fiber suitable for the first fiber layer 232.

On the other hand, the second fiber layer 234 is produced by subjecting the raw material to a heat treatment, performing a process of making the material infusible and a process of flame retardation and then activating the material in water vapor or carbon dioxide and an inert gas. Specifically, carbon fiber is first produced by subjecting the similar raw material to a heat treatment to make it infusible and a process of flame retardation by a process similar to that for the first fiber layer 232. The carbon fiber is then activated in water vapor or carbon dioxide and an inert gas to increase its specific surface area, thereby producing a carbon fiber suitable for the second fiber layer 234.

Figure 7:
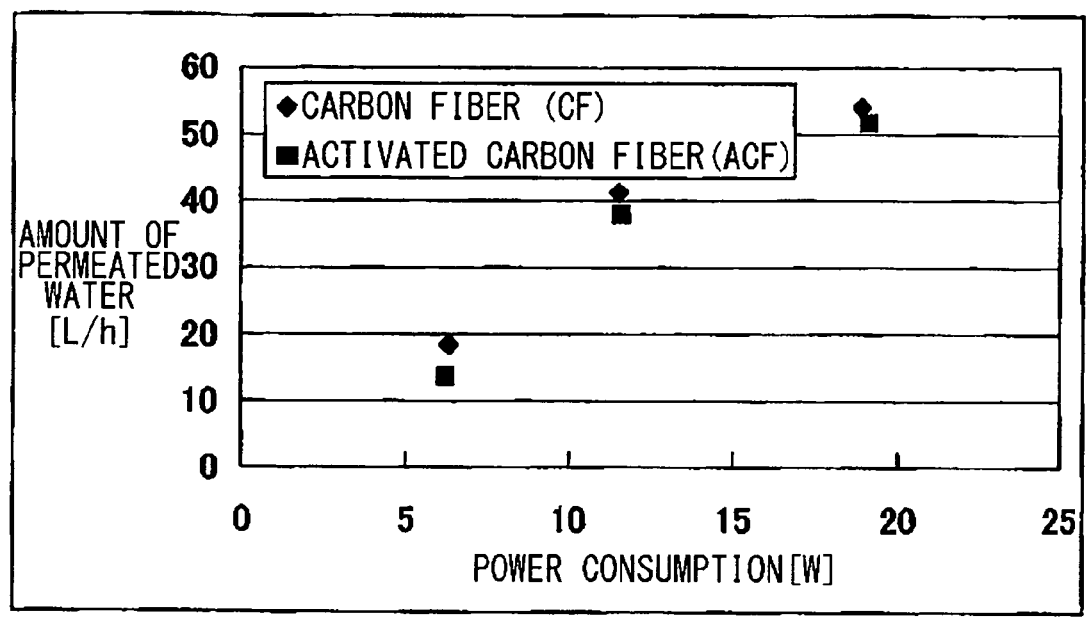
FIG. 7 shows a correlation between the amount of permeated water and power consumption for a first fiber layer and a second fiber layer of a water softening module according to a first embodiment of the present invention, respectively.

It is preferable that the first fiber layer 232 has a greater void ratio than the second fiber layer 234. The void ratio is the percentage of porosity in unit volume of material. For example, the void ratios of the first fiber layer 232 and the second fiber layer 234 are 91% and 80%, respectively. This indicates that the first fiber layer 232 has a higher water permeability (capacity for passing water) than the second fiber layer 234. To be more precise, it is desirable that the water permeability of the first fiber layer 232 is 5 to 40 percent higher than that of the second fiber layer 234. With the water permeability of the first fiber layer 232 set 5% or more higher than that of the second fiber layer 234, there occur conspicuous effects of precipitates having precipitated on the first fiber layer 232 being peeled off by the flowing water. However, since the flow rate of water passing through the water softening module is normally 10 to 100 liter per hour, the water permeability of the first fiber layer 232, when set 40% or more higher than that of the second fiber layer 234, can reduce the efficiency of deposit precipitation at the first fiber layer 232 especially when the flow rate is high. FIG. 7 shows the correlation between the amount of permeated water and power consumption for the first fiber layer 232 and the second fiber layer 234, respectively.

An evaluation of the amount of permeated water was conducted under the following conditions, with polyacrylonitrile-series fiber used as the raw material for the first fiber layer 232 and the second fiber layer 234. The materials used for evaluation were carbon fiber (CF), 65 mm in diameter and 4 mm in thickness, for the first fiber layer 232 and activated carbon fiber (ACF) for the second fiber layer 234. In the experiment, a water softening module 200 as shown in FIG. 6 is used, and carbon fiber (CF) or activated carbon fiber (ACF) is incorporated into a fibrous medium 230 for testing. Tap water was passed through the water softening module 200 having incorporated the carbon fiber (CF) or activated carbon fiber (ACF), and the power consumption of the pump used in the process and the amount of permeated water were measured to obtain data for comparison of water permeation performances.

From FIG. 7, it can be seen that the first fiber layer 232 shows a higher water permeability than the second fiber layer 234.

The support member 240, which is installed in contact with the downstream-side face of the second fiber layer 234, supports the second fiber layer 234. The support member 240 is an insulating member having a meshy or reticulated structure, and the second fiber layer 234 is exposed to the space 274 through the apertures in the support member 240. The support member 240 is formed of a polypropylene resin, for instance. And the aperture ratio of the support member 240 is, for example, 55%.

The securing ring 250, which is a ring-shaped member, is located between the cover member 212 and the electrode 220, with the outer periphery thereof in contact with the inner peripheral surface of the case 210. The securing ring 250 determines the distance between the cover member 212 and the electrode 220, thereby defining the space 270. At the same time, the securing ring 250 will inhibit the infiltration of electrolyzed water between the fibrous medium 230 and the case 210 and prevent any shorting between the space 270 and the space 274.

The securing ring 252, which is a ring-shaped member, is located between the support member 240 and the electrode 222, with the outer periphery thereof in contact with the inner peripheral surface of the case 210. Note that the securing ring 252 is provided with an opening or a notch in alignment with the water outlet 292. The securing ring 252 determines the distance between the support member 240 and the electrode 222, thereby defining the space 274. At the same time, the securing ring 252 will prevent any shorting between the space 270 and the space 274.

The securing ring 254, which is a ring-shaped member, is located between the electrode 222 and the cover member 214, with the outer periphery thereof in contact with the inner peripheral surface of the case 210. The securing ring 254 determines the distance between the electrode 222 and the cover member 214, thereby defining the space 272.

For the assembly of the water softening module 200, the structure may be such that the cover member 212 and the cover member 214 have a larger diameter than the case 210 and such that the peripheral edge parts of the cover member 212 and the cover member 214 are joined to each other using fastening components such as screws, bolts and nuts, and the like. In such a case, it is desirable that the total length of the securing ring 250, the electrode 220, the fibrous medium 230, the support member 240, the securing ring 252, the electrode 222, and the securing ring 254 along the inner periphery of the case 210 exceeds the cylinder length of the case 210. As a result, the securing ring 250, the electrode 220, the fibrous medium 230, the support member 240, the securing ring 252, the electrode 222, and the securing ring 254 can be fastened tight between the cover member 212 and the cover member 214. The stress at the tightening of the case is 10.6 g/cm², for instance.

Next, a description will be given of water softening processing in the water softening module 200. The water softening module 200 in the air sterilizing apparatus 10 is configured such that it is operable by switching between a water softening operation mode, in which the hardness of electrolyzed water is reduced, and a cleaning operation mode, in which power is supplied with the polarity of the electrodes 220 and 222 inverted from that in the water softening operation mode. The cleaning operation mode, to be described in detail later, is an operation mode for removing scales adhering in the water softening module 200.

(Water Softening Operation Mode)

The water softening mode is a mode in which to soften the electrolyzed water, and is performed, for instance, when the air sterilizing apparatus 10 operates to sterilize the air.

As the start of an air sterilizing operation for the air sterilizing apparatus 10 is instructed, the control unit 80 starts not only the fan motor 56 and the like but also the circulation pump 108, the water softening module 200, and the electrolytic cell 300. Then started is the air sterilizing operation of circulating the electrolyzed water through the circulation path including the gas-liquid contact member 100. The flow volume and the flow rate in the water softening operation mode are, for instance, 600 mL/min and 18.0 m/s, respectively.

In the water softening operation mode, the control unit 80 applies the direct current to the electrodes 220 and 222, whereas the electrode 220 and the electrode 222 are set to a cathode (negative potential) and an anode (positive potential), respectively. The fibrous medium 230, which is in contact with and electrically connected to the electrode 220, is a cathode (negative potential).

As a result, at the electrode 220 and the fibrous medium 230, disposed on the upstream side of the flow of electrolyzed water in the water softening module 200, which are cathodes, the following reaction takes place between hydrogen ions ($H^+$) and hydroxide ions ($OH^-$) in the water:

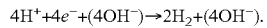

On the other hand, at the electrode 222, disposed on the downstream side, which is an anode, the water is electrolyzed by the following reaction:

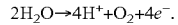

As described above, the hydroxide ions ($OH^-$) are produced in the electrode 220 and the fibrous medium 230 which are cathodes. Since the hydroxide ions are very strong bases, the surfaces of the electrode 220 and fibrous medium 230 which are negatively charged are locally alkaline. This causes the hardness components (calcium ions and magnesium ions) in the electrolyzed water to react with hydroxide ions ($OH^-$) and carbonate ions ($CO_3$), resulting in salts. Specifically, ions, such as calcium ions, magnesium ions, potassium ions and silica ions, contained in the electrolyzed water are precipitated as hardly-soluble salt, such as calcium hydroxide, calcium carbonate, magnesium hydroxide. If ions, such as phosphorus ions, sulfur ions, iron ions, copper ions and zinc ions, are contained in the electrolyzed water, there may be cases where calcium sulfate, calcium sulfite, calcium phosphate, zinc phosphate, zinc hydroxide, basic zinc, ferric chloride, ferric hydroxide, copper hydroxide and so forth are precipitated as salt. Such ions as calcium ions, magnesium ions, potassium ions and silica ions are precipitated as deposits on the electrode 220 and the fibrous medium 230 by electrocrystallization reaction. In particular, since the specific surface area of the second fiber layer 234 is large, a great amount of deposits are precipitated on the surface thereof and therefore the capacity of capturing the precipitates is high.

When the hardness components such as calcium ions, magnesium ions or the like are precipitated on the electrode 220 and the fibrous medium 230 by executing the water softening operation mode, the resulting deposit is called a precipitate or precipitates.

As described above, as the hardness components are precipitated as precipitates, the concentration of hardness components contained in the electrolyzed water that circulates through the flow path is lowered and the electrolyzed water is softened in the water softening operation mode.

The second fiber layer 234 (activated carbon fiber) is 10 to 1000 times larger than the first fiber layer 232 in the surface area per unit weight (i.e., specific surface area), so that the performance of adsorbing ions by the second fiber layer 234 is high. In view of the adsorption performance, the water softening can be accomplished using the second fiber layer 234 only (using a single layer only). However, the second fiber layer 234 is high in adsorption performance and low in capacity for passing water, so that precipitates are precipitated all over the layer and impairs the power feeding. This causes a problem that the power feeding from the electrode 220 to the second fiber layer 234 stops.

In order to resolve the aforementioned problem, the structure is such that the first fiber layer 232 and the second fiber layer 234 are stacked with each other and the first fiber layer 232 whose specific surface area is smaller than that of the second fiber layer 234 is set in an electrode 220 side which is the upstream side with respect to the flow of electrolyzed water. The first fiber layer 232 is low in the performance of adsorbing ions and therefore a smaller amount of precipitates are precipitated there. Thus the precipitation of precipitates in the electrode 220 side can be inhibited and therefore the problem of power supply stoppage can be avoided. Since the required adsorption performance cannot be achieved by the provision of the first fiber layer 232 (single layer) only, the second fiber layer is provided on the downstream side of the first fiber layer 232.

Even though precipitates are precipitated on the first fiber layer 232, the precipitates can be easily peeled off by the flow of electrolyzed water or the polarity inversion. This is because the density of the precipitates precipitated is low. As a result, the occurrence of pressure loss in the flow path is inhibited and therefore the second fiber layer 234, which has a high adsorption performance, can cause precipitates to precipitate efficiently.

In the first embodiment, the space 274 is provided between the support member 240 and the electrode 222, so that this space 274 can be utilized as a precipitation chamber for storing precipitates.

Also, in the first embodiment, the surface (plane) on the downstream side of the second fiber layer 234 is kept flat by the support member 240, so that the variation, occurring within the plane, in electric field strength received on the plane on the downstream side of the second fiber layer 234 is suppressed. Hence, the electrocrystallization reaction to be described later takes place uniformly within the plane on the downstream side of the second fiber layer 234. This causes the precipitates to locally precipitate on the surface of the second fiber layer 234, so that the hindrance to the flow of electrolyzed water is suppressed and the capacity for trapping the precipitates is improved.

Also, the support member 240 having insulation properties is formed as a mesh, so that the electric field is concentrated in the apertures in the support member 240. Hence, the precipitates can be efficiently precipitated on the surface of the second fiber layer 234 in the apertures of the support member 240.

In the water softening operation mode, the peeling-off of the precipitates precipitated on the electrode 220 and the fibrous medium 230 is facilitated by the water flowing from the electrode 220 side to the electrode 222 side. This can suppress excessive growth of precipitates on the electrode 220 and the fibrous medium 230. In particular, since in the first embodiment the water inlet 290 is provided below the cover member 212 with the water outlet 292 provided in the side face of the case 210, the electrolyzed water flows from below to above as illustrated in FIG. 6. This water flow promotes the peeling-off of the precipitates precipitated on the surface of the second fiber layer 234, so that the precipitates trapped in the fibrous medium 230 can be efficiently collected. Since the flow of electrolyzed water is directed from below to above, the gas (e.g., $O_2$) that flows together with the electrolyzed water can be easily discharged outside the case 210.

A general indicator indicating the hardness of water is calculated using the following formula, for example:

[Hardness]=[Calcium content]×2.5+[Magnesium content]×4.1

Here, the unit of hardness, calcium content and magnesium is mg/l, and the hardness evaluated by the above formula is such that the calcium content and the magnesium content (mg) contained per liter of water are converted to the calcium carbonate content (mg). If the hardness obtained by the above formula exceeds 300 to 400 (mg/l), calcium and magnesium are likely to precipitate. However, the use of the water softening module 200 according to the first embodiment enables the hardness of electrolyzed water to drop to 200 (mg/l) or less, so that the precipitation of scales can be inhibited.

(Cleaning Operation Mode)

Next, a description is given of the cleaning operation mode. As the electrolyzed water is processed using the above-described water softening operation mode, precipitates are precipitated on the electrode 220 and the fibrous medium 230. And if a great amount of precipitates are precipitated as the operation time elapses, such precipitation may possibly have an adverse effect on the water softening efficiency of the water softening module 200. Thus it is desirable that the precipitates precipitated on the electrode 220 and the fibrous medium 230 be removed.

The cleaning operation mode is an operation mode designed to dissolve and remove the precipitates precipitated on the electrode 220 and the fibrous medium 230 inside the water softening module 200 and then discharge the thus dissolved and removed precipitates to the drainage tank 62. According to the first embodiment, the cleaning operation mode is performed every time the cumulative operation hours under the water softening operation mode reaches a predetermined time duration. For instance, the cleaning operation mode is performed once every time when the cumulative operation hours of the water softening operation mode reaches 100 hours.

In the cleaning operation mode, the voltage is applied with the polarity of electrodes 220 and 22 inverted from that in the above-described water softening operation mode. That is, the electrode 220 and the fibrous medium 230 are anodes (positive potential), whereas the downstream-side electrode 222 is a cathode (negative electrode).

In this case, as a result of an electrolytic reaction, the surfaces of the electrode 220 and the fibrous medium 230 acidify locally, and the precipitates precipitated on these surfaces and part or whole of the precipitates adhering to the support member 240 are dissolved to become cations. If part of precipitate is dissolved, the precipitate will be more likely to be peeled off from the surface where the precipitate adheres and it will be discharged, together with the electrolyzed water that flows through the discharge pipe 312, from the drainage tank 62.

By employing the air sterilizing apparatus, provided with the above-described water softening module 200, according to the first embodiment, the efficiency of removing hardness components in the water softening module 200 is inhibited. Thus the drop in sterilization efficiency due to the reduced removal efficiency can be suppressed.

Second Embodiment

Figure 8:
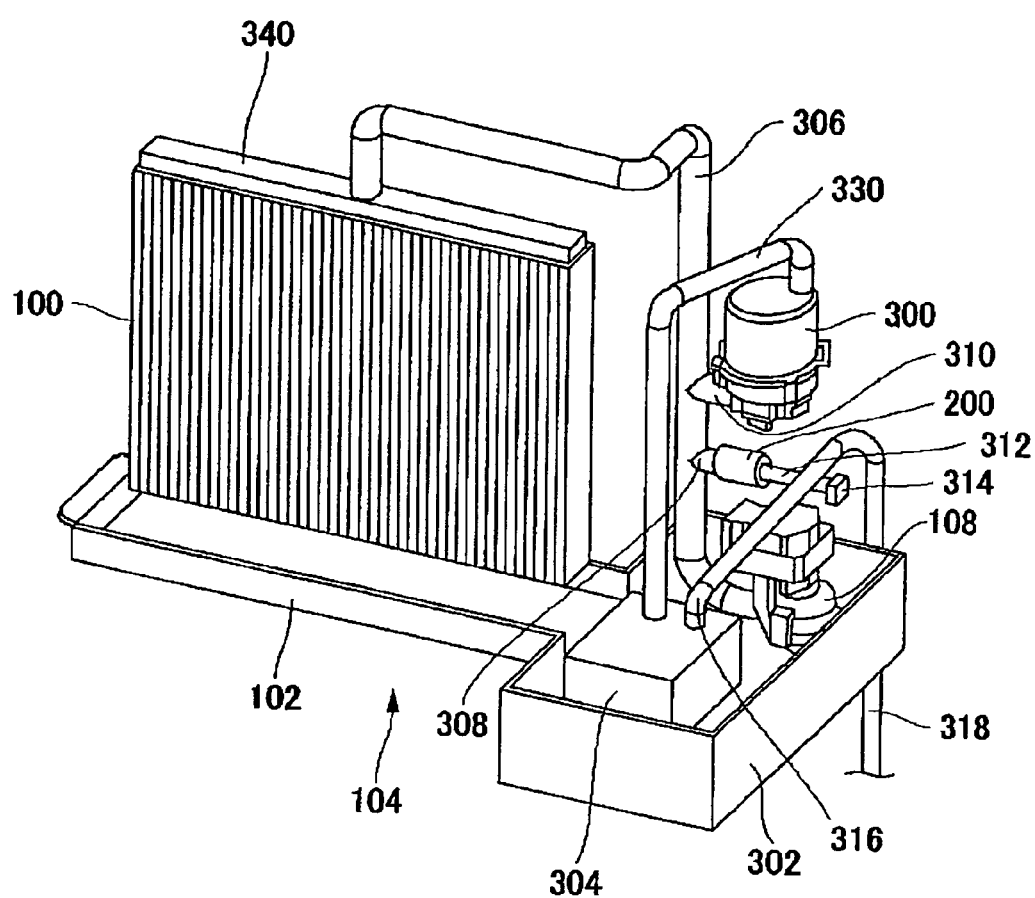
FIG. 8 is a schematic illustration showing a structure of essential part of an air sterilizing apparatus, where electrolyzed water is generated and circulated, according to a second embodiment of the present invention.
Figure 9:
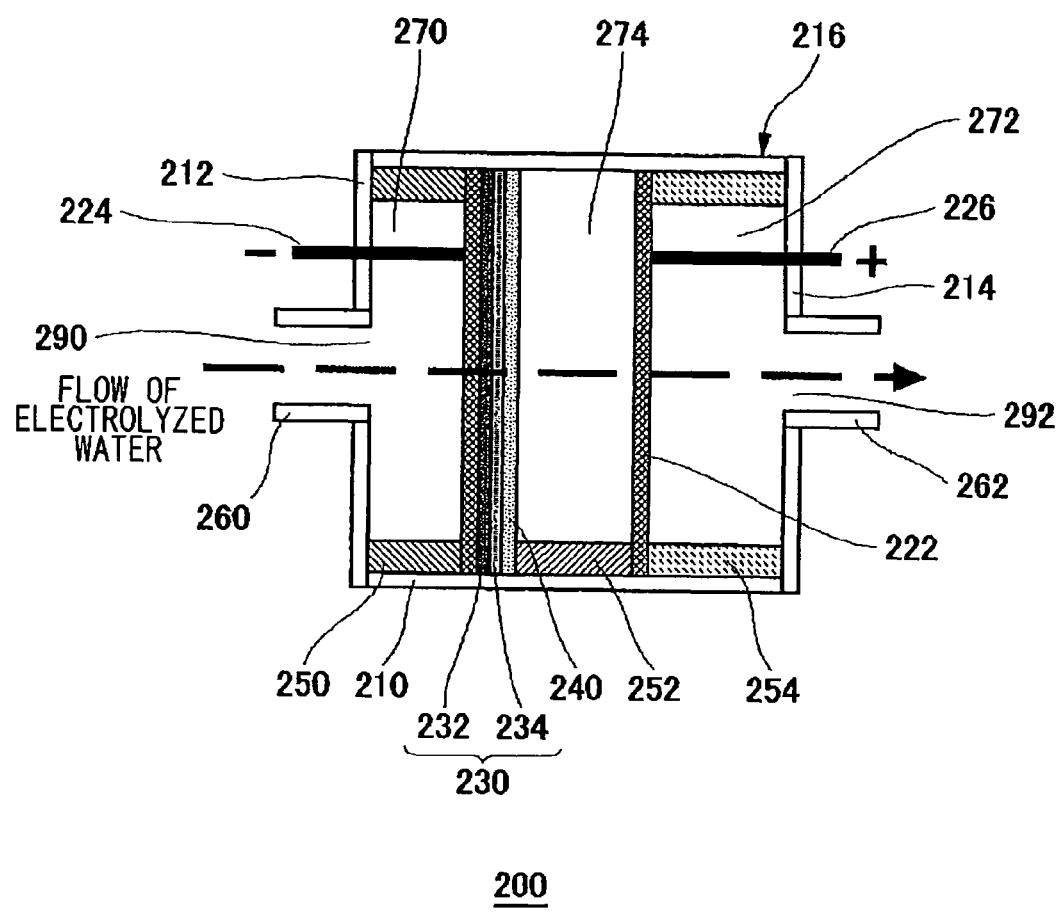
FIG. 9 is a schematic illustration of a structure of a water softening module according to a second embodiment of the present invention.

FIG. 8 is a schematic illustration showing a structure of essential part of an air sterilizing apparatus, where electrolyzed water is generated and circulated, according to a second embodiment of the present invention. FIG. 9 is a schematic illustration of a structure of a water softening module according to the second embodiment. The air sterilizing apparatus 10 according to the second embodiment differs from the first embodiment in the position where the water outlet 292 is disposed and the configuration of the discharge pipe 312. Otherwise, the basic structure of the air sterilizing apparatus 10 according to the second embodiment is similar to that of the air sterilizing apparatus 10 according to the first embodiment. Thus the description of the same structural components as those of the first embodiment will be omitted as appropriate.

As shown in FIG. 9, in the water softening module 200 incorporated into the air sterilizing apparatus 10 according to the second embodiment, the water outlet 292 is provided in a cover member 214 and disposed opposite to the water inlet 290, instead of in the side face of the case 210. Accordingly, the flow of electrolyzed water in the water softening module 200 is linear. With the water outlet 292 positioned accordingly, the discharge pipe 312 linearly connects the water outlet of the water softening module 200 to a three-way valve 314, as shown in FIG. 8.

By implementing the structure as described above, the same advantageous effects as those achieved by the water softening module 200 according to the first embodiment can also be realized except for the effect resulting from the provision of the water outlet 292 in the side face of the case 210 in the water softening module 200 according to the first embodiment. That is, similar to the first embodiment, the occurrence of the pressure loss in the flow path at a first fiber layer 232 is suppressed and the precipitates can be precipitated in a second fiber layer 234 having a larger specific surface area than that of the first fiber layer 232. Also, a space 274 can be utilized as a precipitation chamber for storing precipitates.

Third Embodiment

Figure 10:
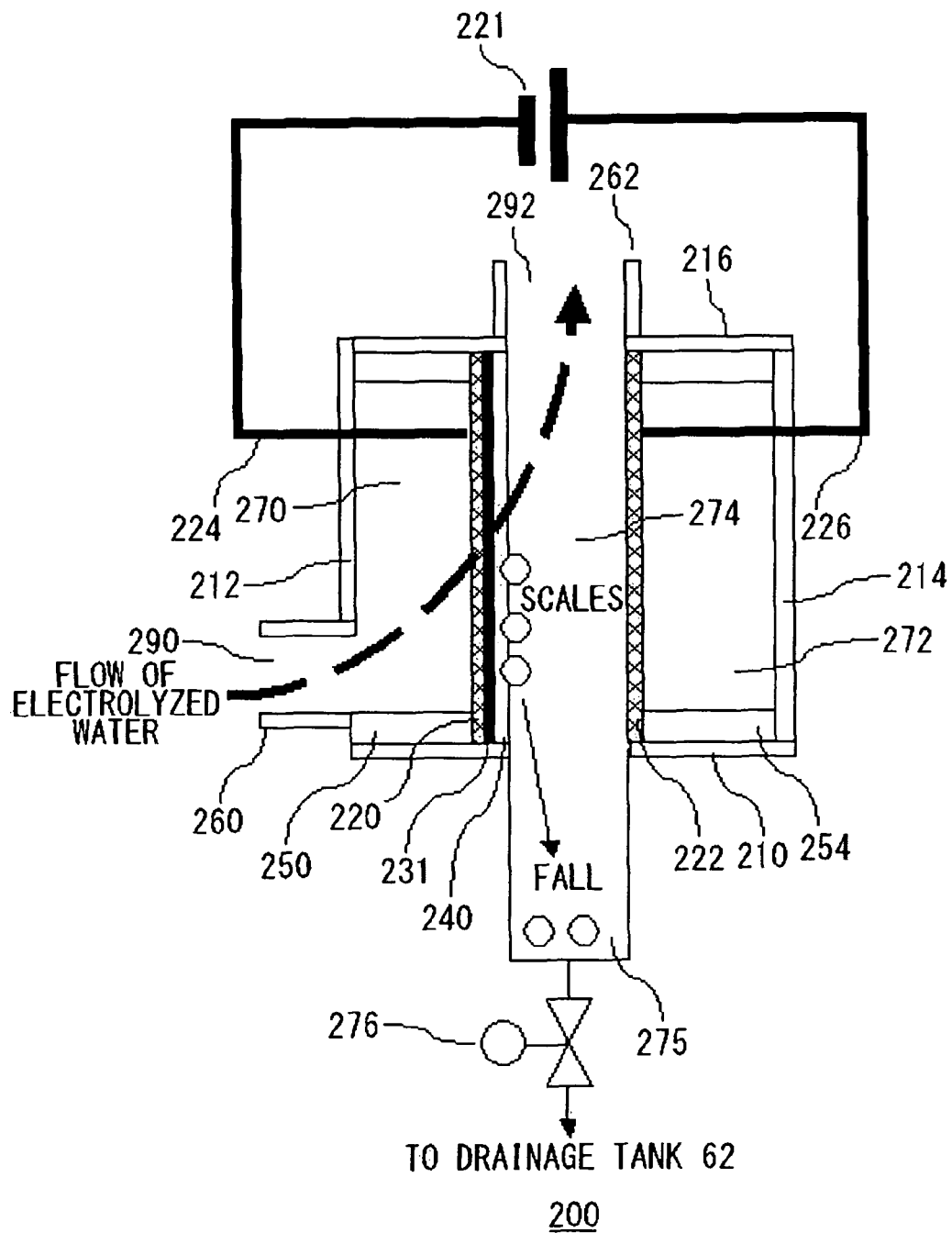
FIG. 10 is a schematic illustration of a structure of a water softening module according to a third embodiment of the present invention.

FIG. 10 is a schematic illustration of a structure of a water softening module according to a third embodiment of the present invention. The basic structure of an air sterilizing apparatus according to the third embodiment is similar to that of the air sterilizing apparatus 10 according to the first embodiment. Thus the description of the same structural components as those of the first embodiment will be omitted as appropriate.

The water softening module 200 according to the third embodiment includes a pair of electrodes 220 (first electrode) and 222 (second electrode), a conductive filtering medium 231 capable of capturing ions, a support member 240 having insulation properties, and securing rings 250 and 254, which are all housed in a case body 216.

In the third embodiment, a space (scale precipitation chamber) 274 is formed between the electrode 220 and electrode 222, and a scale collector 275 that communicates with the scale precipitation chamber 274 is formed below the space 274.

Connected to the electrode 220 is a metallic bar 224 for power feeding on the cover member 212 side. The metallic bar 224, penetrating the cover member 212, is connected to the negative side of a DC power supply 221 provided on the outside of the water softening module 200. In a similar manner, connected to the electrode 222 is a metallic bar 226 for power feeding on the cover member 214 side. The metallic bar 226, penetrating the cover member 214, is connected to the positive side of the DC power supply.

Any one of, or a compound containing at least two of carbon fiber, activated carbon fiber, platinum fiber, titanium fiber, and carbon nanotube is used for the filtering medium 213. Note that it is not necessarily required that the filtering medium 231 be of a fibrous form, and the filtering medium 231 may be made of porous material. In the third embodiment, the filtering medium 231 is made of carbon fiber and is a felt-like member (e.g., 4 mm thick) which is compressible. The compressibility meant here is the property of material whose volume can decrease under pressure.

The support member 240 is installed in contact with the downstream-side face of the filtering medium 231 and supports the filtering medium 231. Also, the support member 240 accelerates the scales precipitated at the filtering medium 231 to fall into the scale collector 275. The support member 240 is an insulating member having a meshy or reticulated structure, and the filtering medium 231 is exposed to the scale precipitation chamber 274 through the apertures in the support member 240. The support member 240 is formed of a polypropylene resin, for instance. And the aperture ratio of the support member 240 is, for example, 55%. Since the support material 140 formed of a polypropylene resin is a material where the surface thereof is smooth, the separation and removal of scales can be facilitated by having the support material 240 come in contact with the filtering medium 231 formed of such carbon fibers that the scales are likely to adhere because of being fibrous.

The securing ring 250, which is a ring-shaped member, is located between the cover member 212 and the electrode 220, with the outer periphery thereof in contact with the inner peripheral surface of the case 210. The securing ring 250 determines the distance between the cover member 212 and the electrode 220, thereby defining the space 270. At the same time, the securing ring 250 will inhibit the infiltration of electrolyzed water between the filtering medium 231 and the case 210 and prevent any shorting between the space 270 and the scale precipitation chamber 274.

For the assembly of the water softening module 200, the structure may be such that the cover member 212 and the cover member 214 have a larger diameter than the case 210 and such that the peripheral edge parts of the cover member 212 and the cover member 214 are joined to each other using fastening components such as screws, bolts and nuts, and the like. In such a case, it is desirable that the total length of the securing ring 250, the electrode 220, the filtering medium 231, the support member 240, the electrode 222, and the securing ring 254 along the inner periphery of the case 210 exceeds the cylinder length of the case 210. As a result, the securing ring 250, the electrode 220, the filtering medium 231, the support member 240, the electrode 222, and the securing ring 254 can be fastened tight between the cover member 212 and the cover member 214. The stress at the tightening of the case is 10.6 g/cm², for instance.

Next, a description will be given of water softening processing in a water softening module 200.

As the start of an air sterilizing operation for the air sterilizing apparatus 10 is instructed, the control unit 80 starts not only the fan motor 56 and the like but also the circulation pump 108, the water softening module 200, and the electrolytic cell 300. Then started is the air sterilizing operation of circulating the electrolyzed water through the circulation path including the gas-liquid contact member 100. The flow volume and the flow rate in the water softening operation mode are, for instance, 600 mL/min and 18.0 m/s, respectively.

In the water softening module 200, as an instruction is given from the control unit 80, the direct current 221 is applied to the electrodes 220 and 222, so that the electrode 220 and the electrode 222 are set to a cathode (negative potential) and an anode (positive potential), respectively. The filtering medium 231, which is in contact with and electrically connected to the electrode 220, is a cathode (negative potential).

As a result, at the electrode 220 and the filtering medium 231, which are cathodes, disposed on the upstream side with respect to the flow of the electrolyzed water in the water softening module 200, the following reaction takes place between hydrogen ions ($H^+$) and hydroxide ions ($OH^-$) in the water:

$$4H^+ + 4e^- + (4OH^-) \rightarrow 2H_2 + (4OH^-).$$

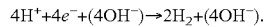

On the other hand, at the electrode 222, disposed in the downstream side, which is an anode, the water is electrolyzed by the following reaction:

$$2H_2O \rightarrow 4H^+ + O_2 + 4e^-.$$

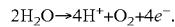

As described above, the hydroxide ions ($OH^-$) are produced in the electrode 220 and the filtering medium 231 which are cathodes. Since the hydroxide ions are very strong bases, the surfaces of the electrode 220 and filtering medium 231 which are negatively charged are locally alkaline. This causes the hardness components (calcium ions and magnesium ions) in the electrolyzed water to react with hydroxide ions ($OH^-$) and carbonate ions ($CO_3$), resulting in salts. Specifically, ions, such as calcium ions, magnesium ions, potassium ions and silica ions, contained in the electrolyzed water are precipitated as hardly-soluble salt, such as calcium hydroxide, calcium carbonate, magnesium hydroxide. If ions, such as phosphorus ions, sulfur ions, iron ions, copper ions and zinc ions, are contained in the electrolyzed water, there may be cases where calcium sulfate, calcium sulfite, calcium phosphate, zinc phosphate, zinc hydroxide, basic zinc, ferric chloride, ferric hydroxide, copper hydroxide and so forth are precipitated as salt. Such ions as calcium ions, magnesium ions, potassium ions and silica ions are precipitated as scales on the electrode 220 and the filtering medium 321 by electrocrystallization reaction.

As described above, as the hardness components precipitate as scales, the concentration of hardness components contained in the circulating electrolyzed water is lowered and the electrolyzed water is softened.

Scales are precipitated on the electrode 220 and the filtering medium 231. The scales get enlarged as the operation time elapses. The electrolyzed water (water to be treated), entering through the water inlet 290, exits through the water outlet.

Also, the electrolyzed water passing through the filtering medium 231 accelerates the scales precipitated on the surface of the filtering medium 231 to fall into the scale collector 275 where the scales are collected.

Also, in the third embodiment, the surface on the downstream side of the filtering medium 231 is kept flat by the support member 240, so that the variation, occurring within a plane, in electric field strength received on the plane on the downstream side of the filtering medium 231 is suppressed. Hence, the electrocrystallization reaction takes place uniformly within the plane on the downstream side of the filtering medium 231. This causes scales to locally precipitate on the surface of the filtering medium 231, so that the hindrance to the flow of the electrolyzed water is suppressed and the capacity for capturing the scales is improved.

Also, the support member 240 having insulation properties is formed as a mesh, so that the electric field is concentrated in the apertures in the support member 240. Hence, the scales can be efficiently precipitated on the surface of the filter medium 231 in the apertures of the support member 240.

In particular, in the third embodiment the water inlet 290 is provided below the cover member 212, and the water outlet 292 is provided above the case 210. Thus the electrolyzed water flows from below to above as illustrated in FIG. 6. This water flow promotes the peeling-off of the scales precipitated on the surface of the filtering medium 231, so that the scales trapped in the filtering medium can be efficiently collected by the scale collector 275. Since the flow of electrolyzed water is directed from below to above, the gas (e.g., $O_2$) that flows together with the electrolyzed water can be easily discharged outside the case 210.

FIG. 10 shows a first case of the third embodiment where the scale collector 275 is provided with a drain valve 276 connected to the drainage tank 62. When a predetermined time duration has elapsed after the start of operation, the control unit 80 opens the drain valve 276 and thereby the scales collected in the scale collector 275 are discharged to the drainage tank 62.

Figure 11:
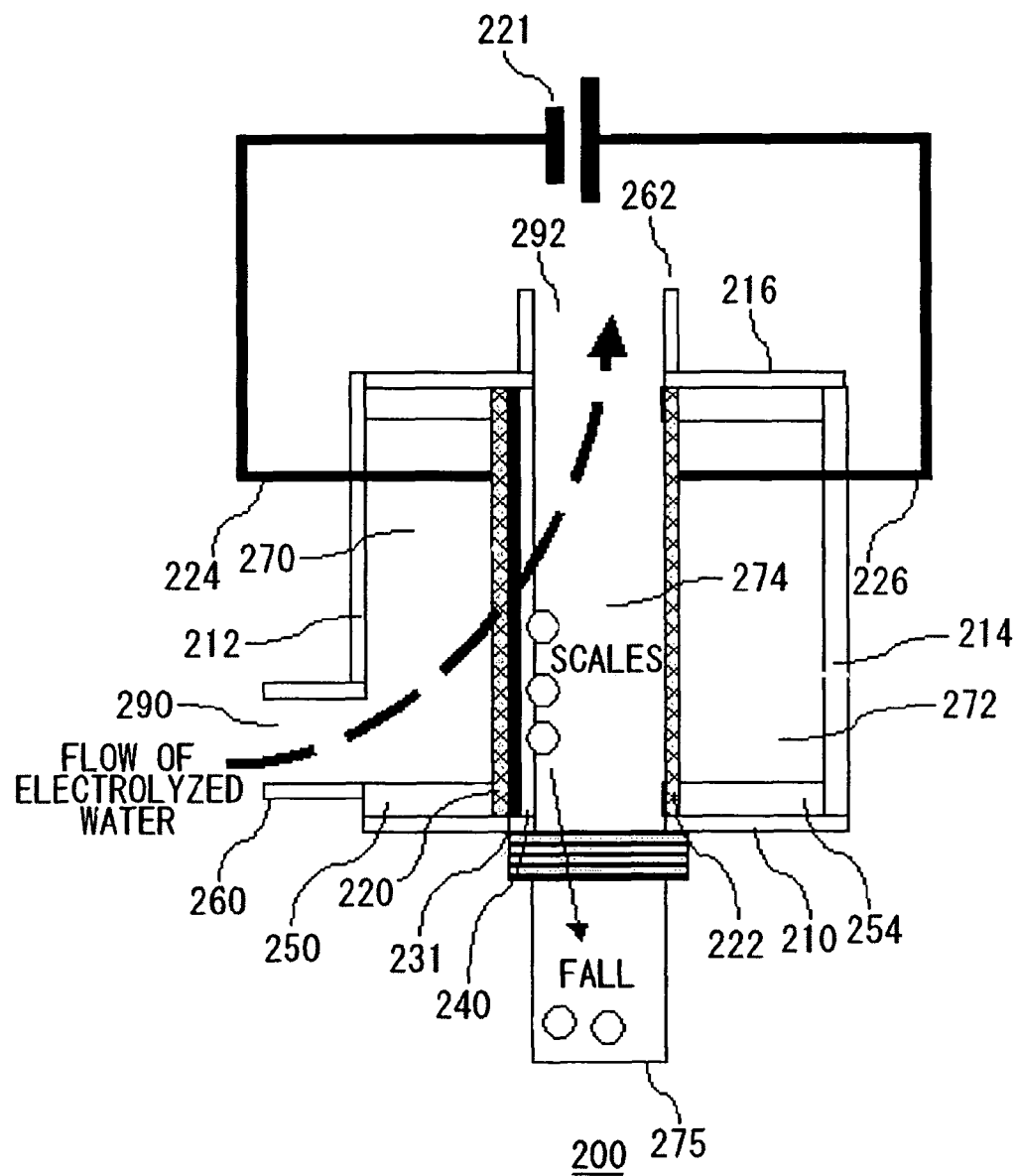
FIG. 11 is a schematic illustration of a structure of a water softening module according to a third embodiment of the present invention.

FIG. 11 shows a second case of the third embodiment where the scale collector 275 is a separate unit, the scale precipitation chamber 274 and the scale collector 275 are joined together by a connection member having a screw cap, and a structure of the connection member is such that the connection member is removably attached by rotating it in a screwing rotation direction. In this case, after a predetermined time duration has elapsed, a user may detach the scale collector 275 and then discard the collected scales.

A general indicator indicating the hardness of water is calculated using the following formula, for example:

$$[\text{Hardness}] = [\text{Calcium content}] \times 2.5 + [\text{Magnesium content}] \times 4.1$$

Here, the unit of hardness, calcium content and magnesium is mg/l, and the hardness evaluated by the above formula is such that the calcium content and the magnesium content (mg) contained per liter of water are converted to the calcium carbonate content (mg). If the hardness obtained by the above formula exceeds 300 to 400 (mg/l), calcium and magnesium are likely to precipitate. However, the use of the water softening module 200 according to the third embodiment enables the hardness of electrolyzed water to drop to 200 (mg/l) or less, so that the precipitation of scales can be inhibited.

The present invention is not limited to the above-described embodiments only, and it is understood by those skilled in the art that various modifications such as changes in design may be made based on their knowledge and the embodiments added with such modifications are also within the scope of the present invention.

In the above-described water softening modules 200, the fibrous medium 230 is of a double-layered structure, for example. The present embodiments are not limited thereto, and the water softening module 200 may have a carbon fiber layer comprised of three or more layers stacked with each other. In such a case, it is preferable that the specific surface area of each layer in the carbon fiber layer decreases toward a downstream side.

While the preferred embodiments of the present invention and their modifications have been described using specific terms, such description is for illustrative purposes only, and it is to be understood that changes and variations may further be made without departing from the spirit or scope of the appended claims.

What is claimed is:

1. A water treatment apparatus having a flow path of water entering through a water inlet and exiting through a water outlet, the water treatment apparatus comprising:
    a first plate-shaped electrode disposed on a water inlet side of the flow path, said first electrode having water permeability;
    a second plate-shaped electrode disposed on a water outlet side of the flow path; and
    a fibrous medium disposed in contact with a water-outlet-side face of said first electrode, the fibrous medium having a profile area almost equal to the peripheral area of said first electrode and being constituted of electrically conductive fiber,
    wherein said fibrous medium includes:
        a first carbon fiber layer disposed on a first electrode side; and
        a second carbon fiber layer disposed on a second electrode side of the first carbon fiber layer, the specific surface area of the second carbon fiber layer being larger than that of the first carbon fiber layer.

2. A water treatment apparatus according to claim 1, wherein a space is provided between said fibrous medium and said second electrode.

3. A water treatment apparatus according to claim 2, further comprising a support member, disposed in contact with a space side of said fibrous medium, which is formed as a mesh made of an insulating material.

4. A water treatment apparatus according to claim 3, wherein the water outlet is provided in such a manner as to be connected to the space between said fibrous medium and said second electrode.

5. A water treatment apparatus according to claim 3, wherein the first carbon fiber layer has a higher water permeability than the second carbon fiber layer.

6. A water treatment apparatus according to claim 2, wherein the water outlet is provided in such a manner as to be connected to the space between said fibrous medium and said second electrode.

7. A water treatment apparatus according to claim 6, wherein the first fiber layer has a higher water permeability than the second carbon fiber layer.

8. A water treatment apparatus according to claim 2, wherein the first carbon fiber layer has a higher water permeability than the second carbon fiber layer.

9. A water treatment apparatus according to claim 1, wherein the first carbon fiber layer has a higher water permeability than the second carbon fiber layer.

* * * * *